US006661473B1

(12) United States Patent
Teshima et al.

(10) Patent No.: US 6,661,473 B1
(45) Date of Patent: Dec. 9, 2003

(54) PROJECTION TYPE TELEVISION RECEIVER, AND MANUFACTURING METHOD THEREOF

(75) Inventors: Akihiko Teshima, Osaka (JP); Tadashi Ohira, Hyogo (JP); Masaru Yoshida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 440 days.

(21) Appl. No.: 09/631,570

(22) Filed: Aug. 4, 2000

(30) Foreign Application Priority Data

Aug. 6, 1999 (JP) ............................................ 11-223382

(51) Int. Cl.⁷ ................................................ H04N 5/64
(52) U.S. Cl. ........................................ 348/787; 312/7.2
(58) Field of Search ................................ 348/744, 787, 348/789, 836, 843; 312/7.2, 10.1, 9.61, 8.16; 361/681, 682; 248/910, 917, 918, 123.2, 506, 501; 359/455–457; 445/23, 66

(56) References Cited

U.S. PATENT DOCUMENTS

| | | | | |
|---|---|---|---|---|
| 4,273,395 A | * | 6/1981 | Martinez et al. | ............ 312/205 |
| 4,831,449 A | * | 5/1989 | Kimura | ........................ 348/738 |
| 5,303,057 A | * | 4/1994 | Davidow et al. | ........... 348/836 |
| 5,315,395 A | * | 5/1994 | Nakao et al. | ................ 348/789 |
| 5,408,283 A | * | 4/1995 | Lee | ............................... 353/77 |
| 5,583,743 A | * | 12/1996 | Levins et al. | ................ 361/683 |
| 5,663,774 A | * | 9/1997 | Baik | ........................ 348/744 |
| 5,739,875 A | * | 4/1998 | Toide et al. | ................. 348/744 |
| 5,808,704 A | * | 9/1998 | Yoshikawa et al. | .......... 348/748 |
| 5,853,237 A | * | 12/1998 | Powell et al. | ............. 312/257.1 |
| 5,929,945 A | * | 7/1999 | Negishi et al. | .............. 348/825 |
| 5,995,170 A | * | 11/1999 | Ohira et al. | ................ 348/836 |
| 6,046,783 A | * | 4/2000 | Park | ........................... 348/836 |
| 6,095,623 A | * | 8/2000 | Goto et al. | .................... 312/7.2 |
| 6,157,416 A | * | 12/2000 | Whitelaw et al. | ............ 348/789 |
| 6,205,229 B1 | * | 3/2001 | Park | ............................ 381/388 |
| 6,209,974 B1 | * | 4/2001 | Goto et al. | .................... 312/7.2 |

FOREIGN PATENT DOCUMENTS

| | | | |
|---|---|---|---|
| EP | 0766465 A1 | 4/1997 | |
| JP | 59110300 A | * 6/1984 | ............ H04R/1/02 |
| JP | 03-044177 | 2/1991 | |
| JP | 3-145797 | 6/1991 | |
| JP | 4-195313 | 7/1992 | |
| JP | 5-129786 | 5/1993 | |
| JP | 5-183847 | 7/1993 | |
| JP | 07-079398 | 3/1995 | |
| JP | 07-219040 | 8/1995 | |
| JP | 08298639 A | * 11/1996 | ............ H04N/5/74 |
| JP | 9-98357 | 4/1997 | |
| JP | 10-042230 | 2/1998 | |

OTHER PUBLICATIONS

European Search Report dated Jan. 30, 2003, for EP 00 11 6141.

* cited by examiner

Primary Examiner—Victor R. Kostak
(74) Attorney, Agent, or Firm—RatnerPrestia

(57) ABSTRACT

A chassis of one size can be used in various sizes of projection unit. That is, in a projection type television receiver having a projection unit of various sizes, one chassis can be commonly used. As a result, the cost is reduced. Includes (a) a chassis including a lower cabinet, a lower cover, an image display device, a speaker system, an optical unit, and a control circuit, and (b) a projection unit including an upper cabinet, an upper back cover, a transmission type screen, and a reflection mirror, the chassis and projection unit are mutually linked. Preferably, the lower cabinet has a speaker box, and the speaker box is formed integrally with the lower cabinet. As a result, the rigidity of the lower cabinet is enhanced. Preferably, the lower cabinet has a left supplementary side wall disposed detachably in the left part of the lower cabinet, and a right supplementary side wall disposed detachably in the right part of the lower cabinet. As a result, the dimension of the lower cabinet is varied flexibly, corresponding to the change of width dimension of the upper cabinet.

49 Claims, 18 Drawing Sheets

PROJECTION TYPE TELEVISION RECEIVER, AND MANUFACTURING METHOD THEREOF

TECHNICAL FIELD OF THE INVENTION

The present invention relates to a projection type television receiver, and a method of manufacturing the same, and more particularly to its cabinet structure.

BACKGROUND OF THE INVENTION

A conventional projection type television receiver has a wooden cabinet of one-body structure. A cathode-ray tube (CRT), an optical unit, a reflection mirror, a control circuit board (also known as chassis or printed wiring board), a speaker system, and others are disposed in the wooden cabinet. A screen frame, a transmission type screen, a speaker grill, a back cover and others are provided at the outer side of the wooden cabinet. The transmission type screen includes a Fresnel lens sheet and a lenticular lens sheet. In the conventional projection type television receiver, in every different inch size or type of the projection screen, it was necessary to modify the cabinet main body and peripheral parts.

FIG. 18 is a perspective outline view of a conventional projection type television receiver. In FIG. 18, a transmission type screen 53, a screen frame 49, a speaker grill 50, a back cover 51, and others are provided in a one-body wooden cabinet 48. Speakers 52 are also provided in the wooden cabinet 48.

However, the conventional one-body type wooden cabinet had the following problems. It was difficult to reduce in size and weight. When changing over models, it was necessary to make new parts such as cabinet and other components, and it was hard to use the parts commonly. When changing the speaker unit, too, it was necessary to modify the cabinet main body. Further, it required many steps in manufacturing the apparatus.

SUMMARY OF THE INVENTION

A projection type television receiver of the invention comprises:
(a) a chassis,
in which the chassis includes a lower cabinet, a lower cover fitted to the lower cabinet, an image display device, a speaker system, an optical unit, and a control circuit, and
(b) a projection unit installed at the upper side of the chassis, in
which the projection unit includes an upper cabinet, an upper back cover fitted to the upper cabinet, a transmission type screen, and a reflection mirror,
in which the chassis and the projection unit are mutually linked.

In this configuration, corresponding to the projection unit of various sizes, one large chassis can be used. That is, in the projection type television receivers having the projection units of various sizes, one chassis can be commonly used. As a result, the cost can be reduced.

A manufacturing method of projection type television receiver of the invention comprises:
(a) a step of making a lower cabinet,
(b) a step of making a lower back cover,
(c) a step of making an upper cabinet,
(d) a step of making an upper back cover,
(e) a step of fitting the lower back cover to the lower cabinet, and
(f) a step of coupling the upper back cover and upper cabinet on the lower cabinet by coupling means.

In this configuration, one chassis can be commonly used in the projection type television receivers having projection units of various sizes. Moreover, the assembling work is easy. Hence, the cost can be reduced.

Preferably, the lower cabinet has a speaker box, and the speaker box is integrally formed in the lower cabinet. As a result, the rigidity of the lower cabinet is enhanced.

Preferably, the speaker box is formed integrally in the lower cabinet, at both corners of the top side of the lower cabinet, and the speaker box has a plurality of ribs formed on the top of the speaker box. As a result, vibration generated in the speaker box is prevented from propagating to the projection unit.

Preferably, the lower cabinet includes a left supplementary side wall installed detachably at the left side of the lower cabinet, and a right supplementary side wall installed detachably at the right side of the lower cabinet. As a result, corresponding to the change of lateral width dimension of the upper cabinet, the size of the lower cabinet can be changed.

Preferably, the projection type television receiver further comprises at least one selected from the group consisting of a first plumb placed in the bottom of the lower cabinet, a first plumb placed in the rear part of the upper back cover, and an anti-tumble leg placed in the front lower part of the lower cabinet. As a result, tumbling of the projection type television receiver is prevented.

Preferably, the lower cabinet has a partition wall placed in the lower cabinet, and the cabinet has a plurality of spaces divided by the partition wall. The chassis has a plurality of control circuit boards, and each one of the plurality of control circuit boards is placed at least in two spaces of the plurality of spaces. As a result, mutual thermal effects of the control circuit boards is prevented.

Preferably, the projection type television receiver has a plate placed between the chassis and the projection unit so as to divide into the chassis and the projection unit. As a result, invasion of at least dust and heat is prevented mutually in the chassis and projection unit.

Figure 1:
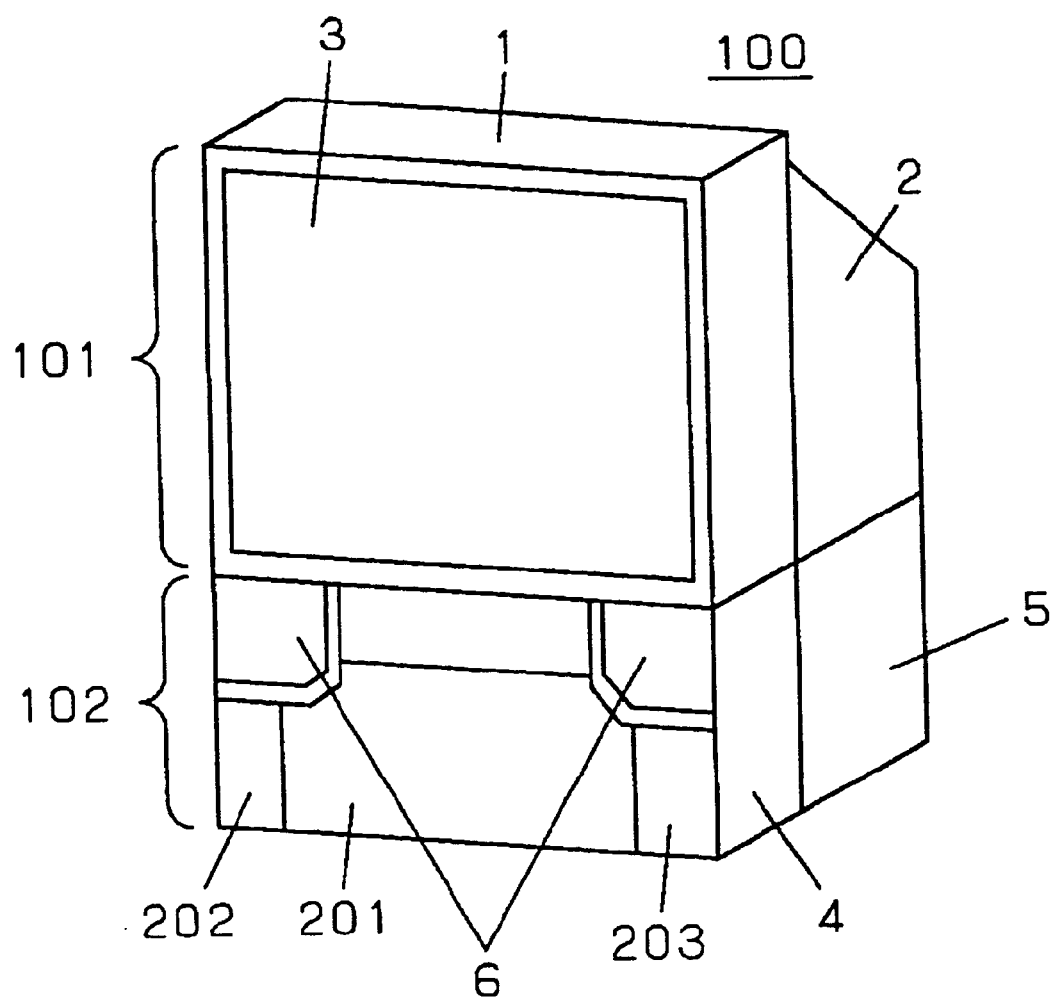
FIG. 1 is a perspective essential outline view of the concept of a projection type television receiver in embodiment 1 of the invention.

REFERENCE NUMERALS 1, 151, 161 Upper cabinet
2, 152, 162 Upper back cover
3 Transmission type screen
4, 154, 164, 174 Lower cabinet
4A Side wall
5 Lower back cover
7, 176 Speaker box
6A, 6B Boss
7 Main chassis (control circuit board)
8 Sub-printed circuit A (control circuit board)
9 Sub-printed circuit B (power circuit board)
10 Post A (partition wall)
11 Post B (partition wall)
12 Optical unit
12A Metal plate case
13 Partition board
14 Rack board of lower cabinet operation panel
15 Video display device, cathode-ray tube (CRT)
16 Lens
17 Radiator
18 Speaker baffle board (right)
18A Bass reflex board
19 Grating rib
20 Speaker (tweeter)
21 Speaker (woofer)
22 Speaker baffle board (left)
23 Speaker (full range type)
24 Skirt
25 Guide rig
26 51-inch upper cabinet
27 43-inch upper cabinet
28 46-inch wide upper cabinet
29 51-inch lower cabinet
30 43-inch lower cabinet
31 Left side insert (supplementary side wall)
32 Right side insert (supplementary side wall)
33, 45 Tightening screw
36 Lenticular lens sheet
37 Fresnel lens sheet
38 Screen clamp
39 Screw
40 Anti-tumble plumb
41 Reflection mirror (film mirror)
42 Speaker grill
43 Speaker grill fixing clamp
44 Anti-tumble leg
46 Speaker grill tightening screw
47 Caster
100 Projection television receiver
101 Projection unit (upper half)
102 Chassis (lower half)
201 Central chamber
202 Small right chamber
203 Small left chamber

DETAILED DESCRIPTION OF THE INVENTION

The projection type television receiver and its manufacturing method of the invention feature the following points.

(1) The projection type television receiver is divided into two upper and lower blocks, chassis and projection unit, and the chassis and projection unit are linked by screw tightening or similar means.

(2) Cabinets for composing the chassis and projection unit are formed of resin molding materials.

(3) In the lower cabinet for composing the chassis, the speaker box is formed integrally. As a result, the strength of the lower cabinet is improved.

(4) The lower cabinet is divided into three spaces by partition walls, that is, into a central chamber, and small chambers at both sides, and a control circuit board is disposed in at least one of the small chambers. As a result, the control circuit board disposed in the central chamber is hardly affected by heat radiation.

(5) The chassis and projection unit are divided by a partition plate or the like. As a result, invasion of dust or heat into the chassis and projection unit is prevented.

(6) The partition plate has a slope. As a result, the air flows along the partition plate, and release of heat is promoted.

(7) The partition plate is made of metal member, or a member having an equivalent or superior heat transfer characteristic as compared with the metal plate. As a result, the partition plate has a function as cooling plate.

(8) Grating ribs are formed on the top of the speaker box. As a result, vibration generated by the speaker box is hardly transmitted to the member mounted on the top of the speaker box.

(9) A plumb is fitted at least to the bottom of the lower cabinet or the rear side of the upper back cover. As a result, tumbling of the receiver is prevented. Further, an anti-tumble leg is fitted also to the front lower part of the lower cabinet.

A projection type television receiver in an embodiment of the invention includes a projection unit (upper half) and a chassis (lower half). The chassis and projection unit are linked with each other. The chassis includes a lower cabinet, and a lower back cover fitted to the lower cabinet. A control circuit unit of speaker system and optical unit is disposed in the lower cabinet. The projection unit includes an upper cabinet, and an upper back cover fitted to the upper cabinet. A transmission type screen and a reflection mirror are disposed in the upper cabinet. In this construction, it is easy to assemble the projection type television receiver. The chassis can be commonly used, and the chassis can be easily and flexibly used depending on the change of size of the projection unit. As a result, the cost is reduced.

Preferably, the lower cabinet has three spaces, that is, a central chamber, and small chambers at both sides, and these three spaces are divided by partition walls. A control circuit board is disposed in at least one of the small chambers. In this constitution, the control circuit board disposed in the small chamber is hardly affected by heat radiation from the control circuit board disposed in the central chamber. Further, in both small chambers, subsidiary control circuit boards can be installed. Still more, the rigidity of the lower cabinet is enhanced.

Preferably, the chassis and projection unit are divided by a partition plate or the like. In this constitution, invasion of dust or heat into the chassis and projection unit is mutually prevented. Further, clouding of optical unit (such as lens unit for magnified projection) and mirror is prevented, and thermal expansion of transmission type screen is lessened.

Preferably, the partition plate is inclined, and the air flows along the partition plate. The partition plate is made of metal member. In this constitution, release of heat is promoted.

Preferably, grating ribs are formed on the top of the speaker box. In this constitution, vibration generated by the speaker box is hardly transmitted to the member mounted on the top of the speaker box.

Preferably, the projection unit has an upper cabinet fitted to the upper back cover, and when the upper back cover is mounted and fixed on the top side of the lower cabinet, the upper back cover can be fitted to the guide portion of the lower cabinet. In this constitution, the upper back cover can be mounted in a stable self-supporting state.

Preferably, the supplementary side wall is detachably fitted to both sides of the lower cabinet. In this constitution, depending on the change of the width dimension of the upper cabinet, the lower cabinet can be easily changed in dimension.

Preferably, the plumb is fitted at least in the bottom of the lower cabinet or the rear side of the upper back cover, and the anti-tumble leg is fitted to the front lower part of the lower cabinet. In this constitution, tumbling of the television receiver is prevented.

A manufacturing method of projection type television receiver in an embodiment of the invention comprises:

(a) a step of making a lower cabinet,
(b) a step of making a lower back cover,
(c) a step of making an upper cabinet,
(d) a step of making an upper back cover,
(e) a step of fitting the lower back cover to the lower cabinet, and
(f) a step of coupling the upper back cover and upper cabinet on the lower cabinet by coupling means.

In this constitution, the assembling work of projection type television receivers is easy. The chassis can be used commonly, and the chassis is used easily and flexibly, coping with changes in the size of the projection unit. As a result, the cost can be reduced.

Preferably, the manufacturing method of projection type television receiver further comprises:

(g) a step of placing a speaker system, an optical unit, and a control circuit in the lower cabinet,
(h) a step of installing a transmission screen in the upper cabinet, and
(i) a step of installing a reflection mirror in the upper back cover.

Preferably, the step of making the lower cabinet includes a step of forming a speaker box integrally in the lower cabinet, at the upper corner of the lower cabinet.

Preferably, the step of making the lower cabinet includes a step of forming the lower cabinet by a resin material, the step of making the upper cabinet includes a step of forming the upper cabinet by a resin material, the step of making the lower back cover includes a step of forming the lower back cover by a resin material, and the step of making the upper back cover includes a step of forming the upper back cover by a resin material.

Preferably, the lower cabinet has a plurality of small chambers divided by partition walls, and the step (g) includes a step of placing a first control circuit board in a first small chamber of the plurality of small chambers, and a step of placing a second control circuit board in a second small chamber of the plurality of small chambers.

Preferably, at least one of the lower cabinet and lower back cover has a partition board, and the partition board has a function of dividing into the upper side and lower side of the partition board.

Preferably, the partition board has a shape inclined to the horizontal direction, and the partition board has a function of forming a flow of air along the inclined shape to release the heat to outside.

Preferably, the partition board is made of a material having a thermal conductivity equivalent or superior to that of metal.

Preferably, the partition plate contacts with the metal plate case of the heat generation unit.

Preferably, the step of making the lower cabinet includes a step of forming a speaker box integrally with the lower cabinet at the upper corner of the lower cabinet, and the speaker box has ribs placed on the top of the speaker box, and these ribs have a function of preventing propagation of vibration generated from the speaker box.

Preferably, the method further comprises:

(j) a step of placing at least one selected from the group consisting of:
a first plumb placed in the bottom of the lower cabinet,
a first plumb placed in the rear part of the upper back cover, and
an anti-tumble leg placed in the front lower part of the lower cabinet.

Preferably, the step (f) of putting the upper back cover on the lower cabinet includes a step of mounting the upper back cover on the lower cabinet, in a self-supporting state of the upper back cover, while fitting a second guide formed in the upper back cover to the first guide formed in the lower cabinet.

Preferably, the upper cabinet has also a function of screen frame, and the method further comprises:

(k) a step of laminating and mounting a lenticular lens sheet and a Fresnel lens sheet on the upper cabinet.

Preferably, the method further comprises:

(l) a step of coupling a supplementary side wall detachably at least at one side of right side and left side of the lower cabinet.

By the manufacturing method of the projection type television receiver, the same effects as in the constitution of the projection type television receiver are obtained.

Exemplary embodiments of the projection type television receiver of the invention are explained below while referring to the drawings.

Exemplary Embodiment 1

A projection type television receiver in embodiment 1 of the invention is explained below while referring to FIG. 1 to FIG. 7.

Figure 2:
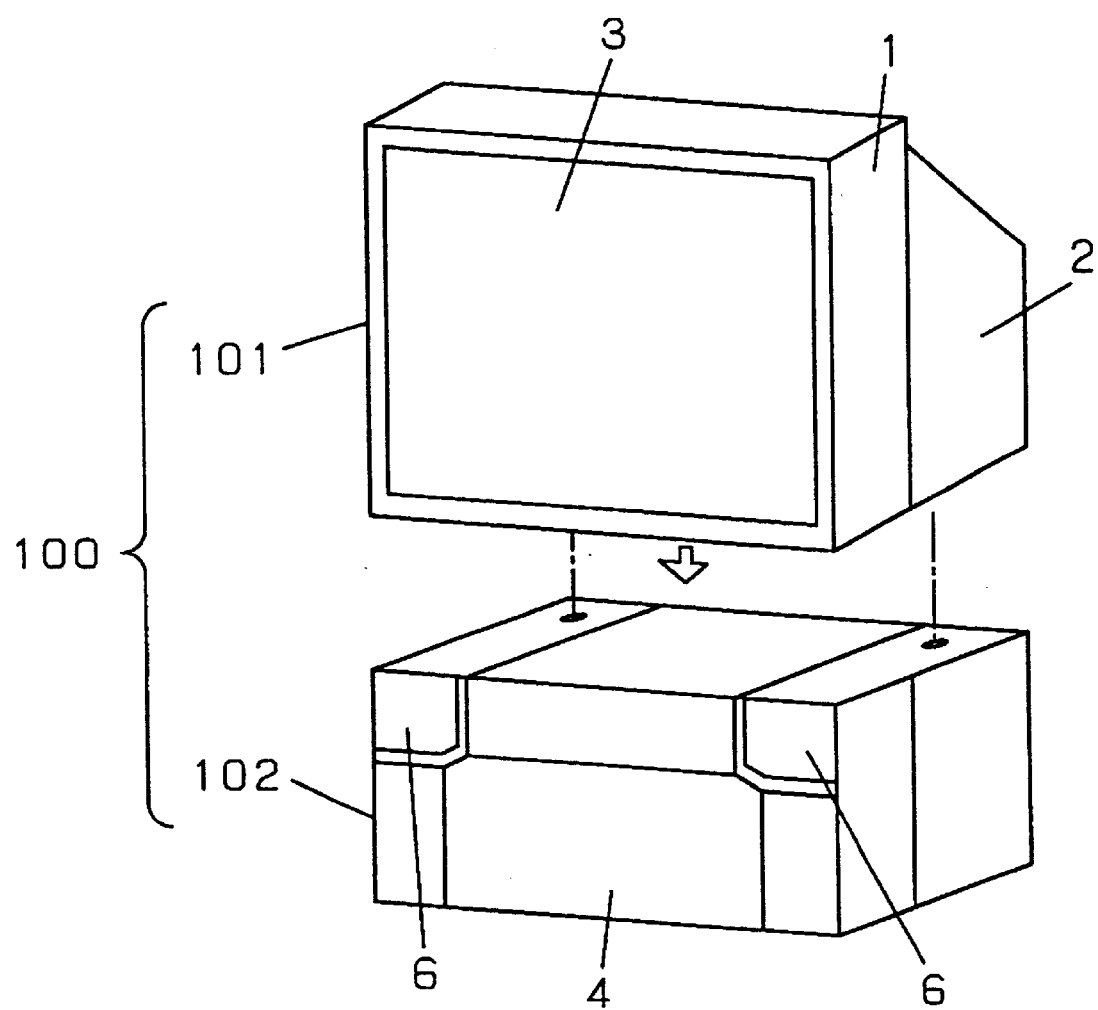
FIG. 2 is a perspective essential exploded view before assembly of the projection type television receiver shown in FIG. 1.
Figure 3:
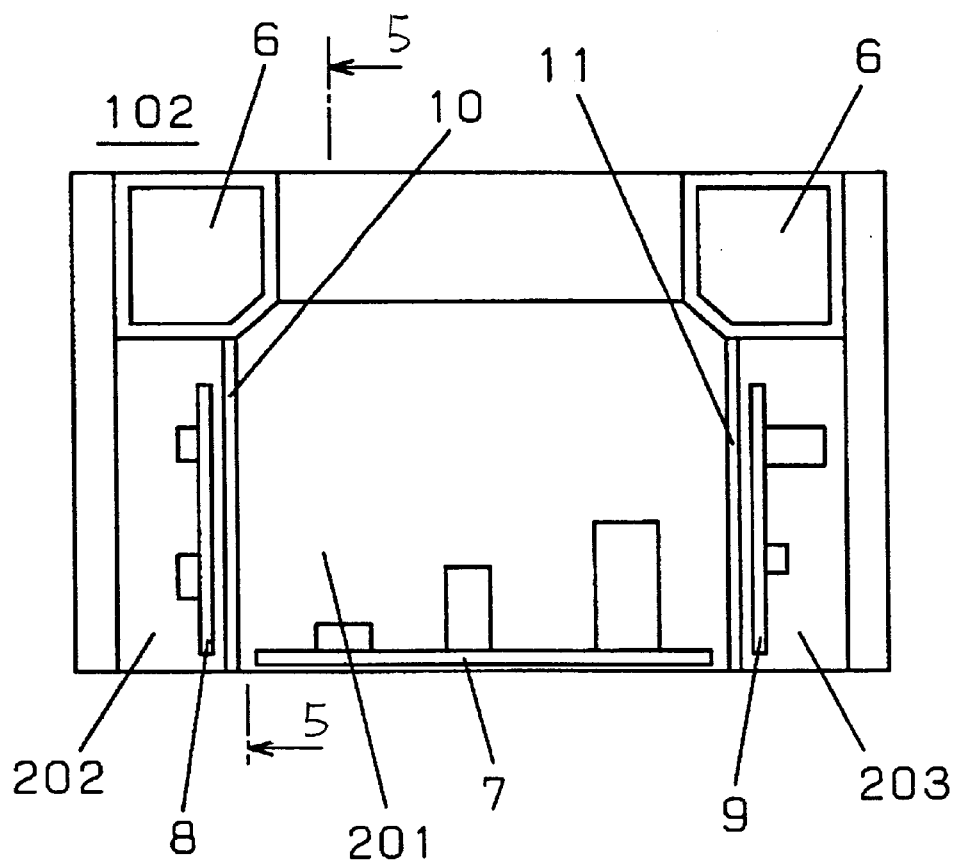
FIG. 3 is an essential front view of a chassis for composing the projection type television receiver shown in FIG. 1.
Figure 4:
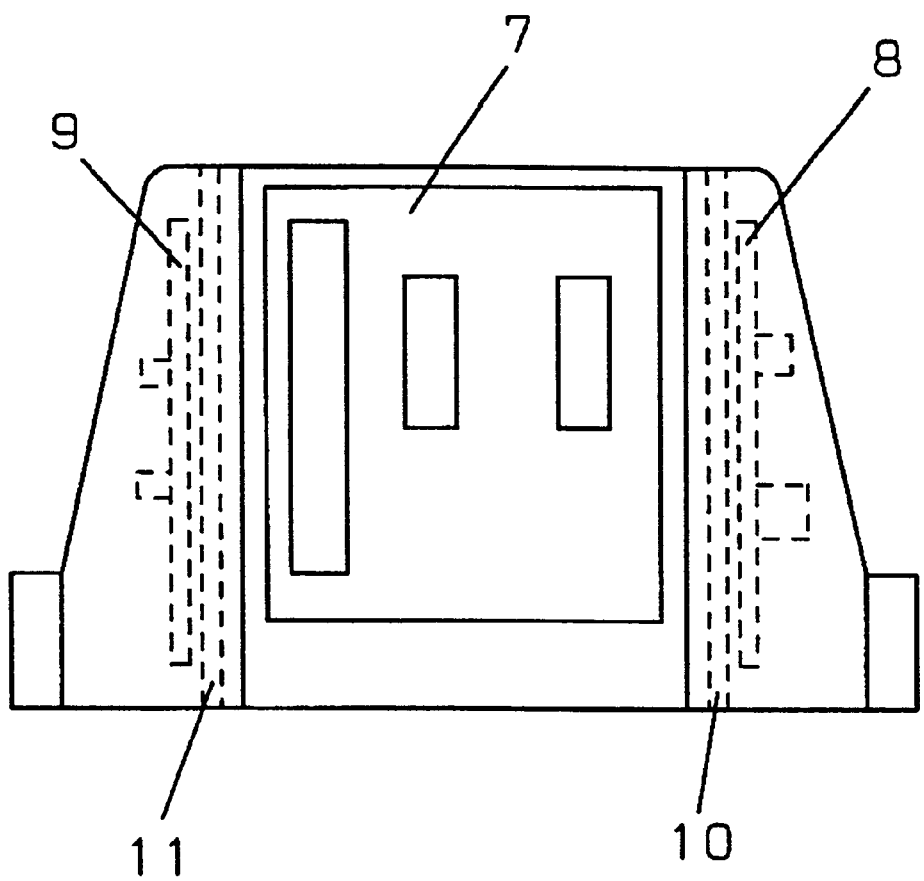
FIG. 4 is an essential plan view of the chassis shown in FIG. 3.
Figure 5:
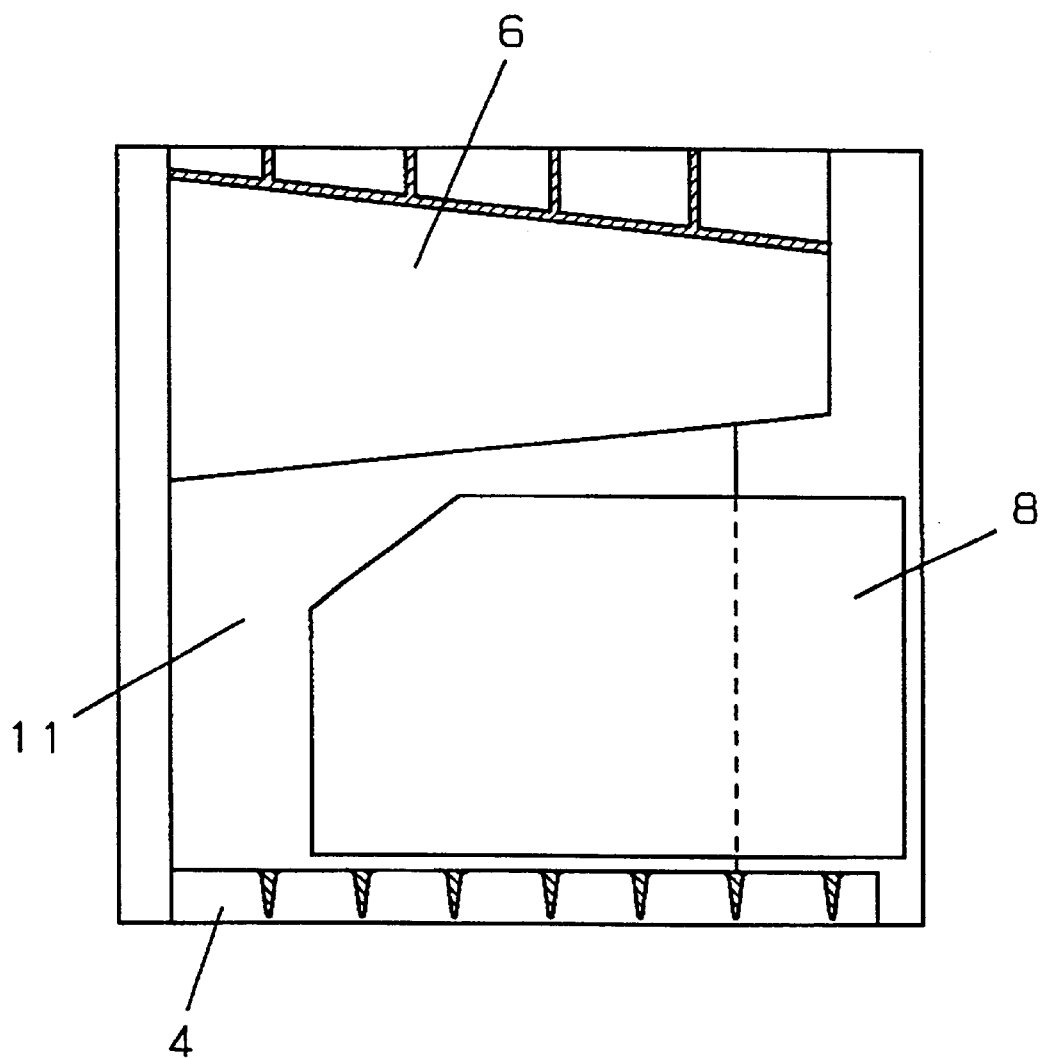
FIG. 5 is an essential sectional view in the side direction of the chassis shown in FIG. 3 being cut off along line 5—5.
Figure 6:
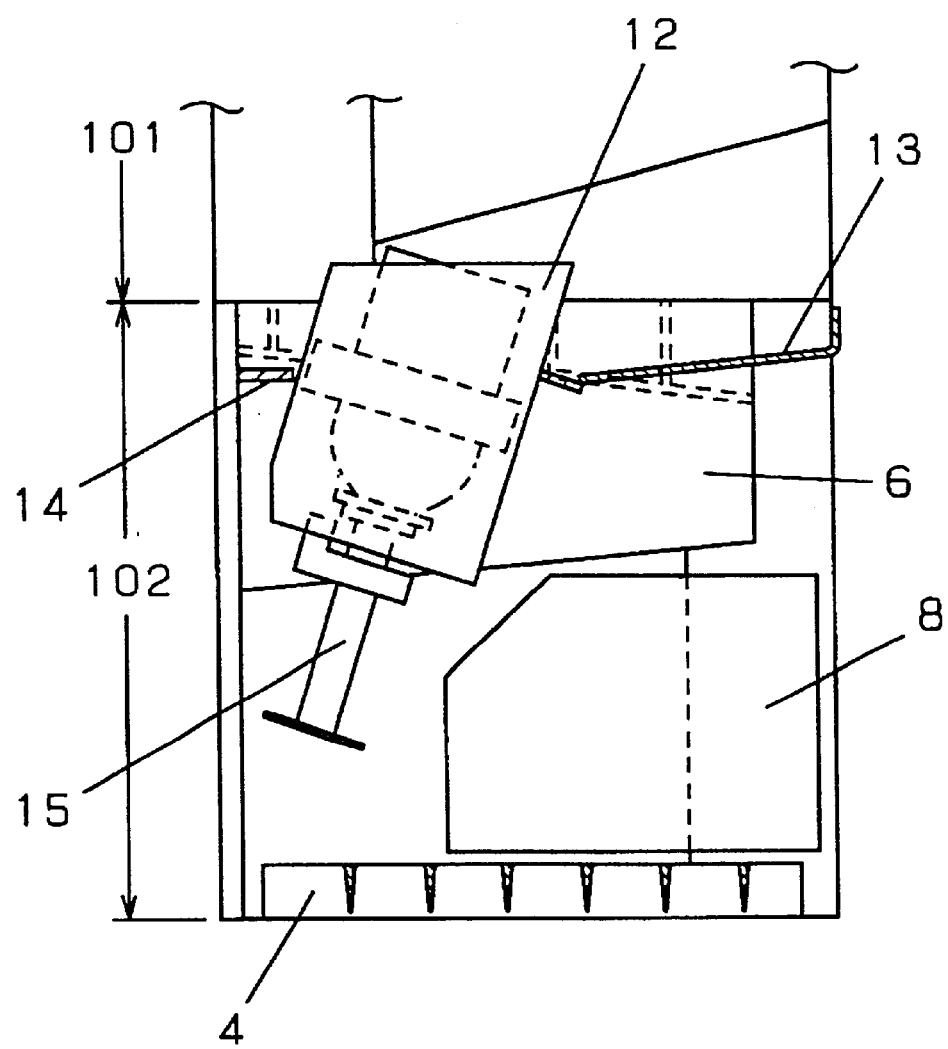
FIG. 6 is an essential sectional view of adding an optical unit, a partition board and a rack board to the chassis unit shown in FIG. 5.
Figure 7:
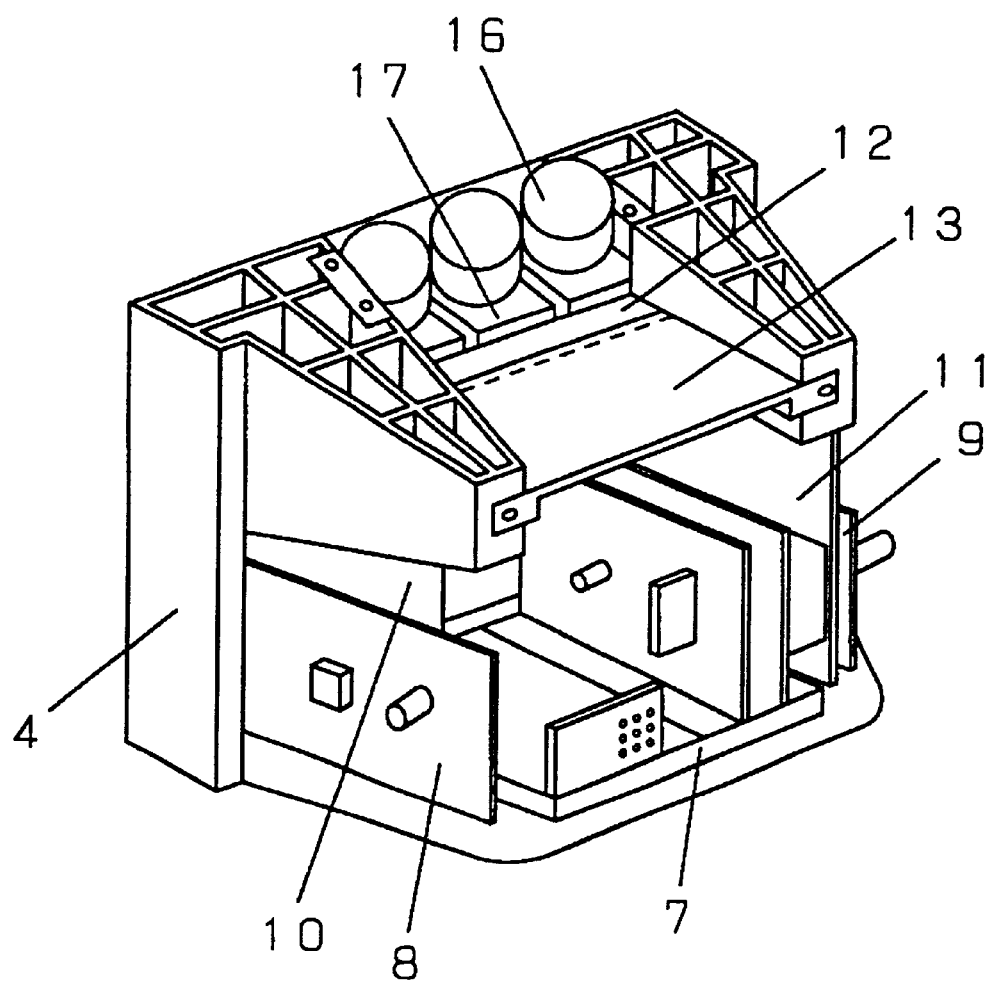
FIG. 7 is a perspective essential outline view of the chassis removing the lower back cover as seen from behind.

FIG. 1 is a perspective essential outline view of the concept of a projection type television receiver in exemplary embodiment 1. FIG. 2 is a perspective essential exploded view before assembly of FIG. 1. FIG. 3 is an essential front view of a chassis for composing FIG. 1. FIG. 4 is a plan view of FIG. 3. FIG. 5 is an essential sectional view in the side direction of the chassis shown in FIG. 3 being cut off along line 5—5. FIG. 6 is an essential sectional view of adding an optical unit, a partition board and a rack board to the chassis unit shown in FIG. 5. FIG. 7 is a perspective essential outline view of the chassis removing the lower back cover as seen from behind.

As shown in FIG. 1, FIG. 2, FIG. 6, and FIG. 7, a projection type television receiver 100 comprises a chassis 102 (lower half) and a projection unit 101 (upper half). The chassis 102 and projection unit 101 are coupled together by means of screw or other tightening means. The chassis 102 includes a lower cabinet 4, and a lower back cover 5 fitted to the lower cabinet 4. An image display device 15, optical unit 12, a control circuit, and a speaker system are disposed in the lower cabinet 4. As the image display device 15, a cathode-ray tube (CRT) or liquid crystal display panel is used. In this embodiment, the image display device 15 has a cathode-ray tube. The control circuit has a plurality of control circuit boards (printed wiring boards, etc.). The projection unit 101 includes an upper cabinet 1, and an upper back cover 2 fitted to the upper cabinet 1. A transmission type screen 3 is fitted to the upper cabinet 1. The reflection mirror is disposed at the inner side of the upper back cover 2. Two speaker boxes 6 placed at right and left corners of the upper side of the lower cabinet 4, integrally with the lower cabinet 4. The speaker boxes 6 and the lower cabinet 4 are manufactured by injection molding integrally by using resin members. By forming the speaker boxes 6 and lower cabinet 4 integrally, the rigidity of the lower cabinet 4 is enhanced.

As shown in FIG. 3, FIG. 4, and FIG. 5, the lower cabinet 4 includes a central chamber 201, and a right small camber 203 and a left small chamber 202 disposed at both sides of the central chamber 201. Thus, the lower cabinet 4 is divided into three spaces. The central chamber 201, right small chamber 203 and left small chamber 202 are divided by a post A10 and a post B11. The post A10 and post B11 are disposed at the lower part of the right and left speaker boxes 6, 6, and also function as partition walls. A subsidiary printed circuit board B9 (power circuit board) is disposed in the right small chamber 203. A subsidiary printed circuit board A8 (control circuit board) is disposed in the left small chamber 202. In this constitution, the subsidiary printed circuit board B9 and subsidiary printed circuit board A8 are hardly influenced by heat radiation from the main printed circuit board (control circuit board) disposed in the central chamber 201.

In this constitution, the subsidiary control circuit boards are disposed in the right and left small chambers at both sides.

Further, the rigidity of the lower cabinet 4 is enhanced. The projection type television receivers can be assembled easily. The chassis can be used commonly, and the chassis can be manufactured in a desired size depending on the size changes of the projection unit. As a result, the cost is reduced.

As shown in FIG. 6 and FIG. 7, the chassis 102 and projection unit 101 are divided by plates such as partition board 13 and rack board 14. In this constitution, invasion of dust or heat is prevented mutually in the chassis 102 and projection unit 101. Accordingly, clouding of optical unit 12 (lens unit for magnified projection, etc.) and mirror 41 can be prevented, and thermal expansion of transmission type screen 3 is lessened.

Further, the partition board 13 has an inclined shape so as to be lifted toward the rear side of the chassis 102. The air flow is formed along the partition board 13.

The partition board 13 has a metal member, or other member having a thermal conductivity equivalent or superior to that of the metal member. In this constitution, heat release of the chassis is promoted.

Accordingly, the heat from the optical unit 12 which generates heat most is released to outside, and accumulation of heat inside the television receiver is prevented.

Figure 8:
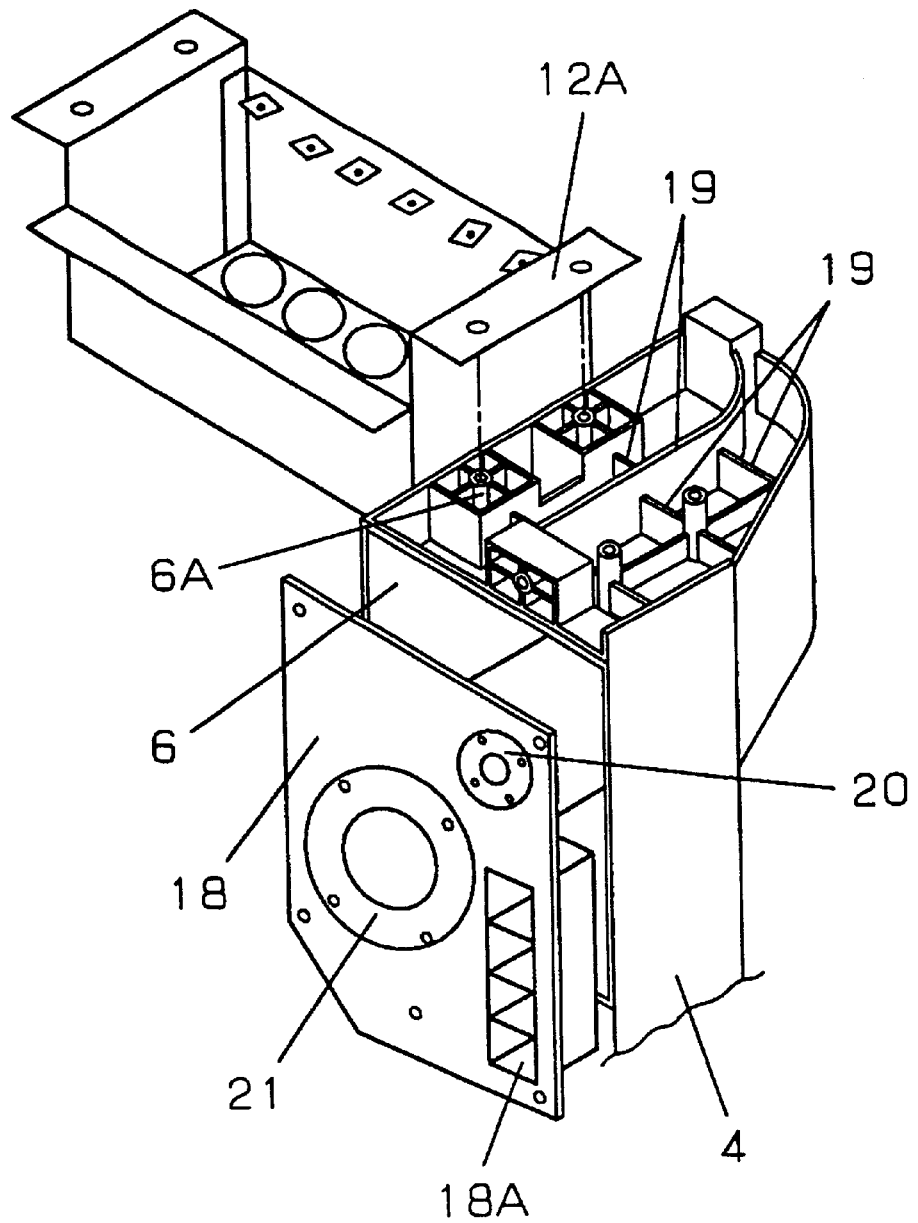
FIG. 8 is a perspective essential exploded view in the process of mounting a metal plate case for optical unit and a speaker baffle board on the speaker box shown in FIG. 1.
Figure 9:
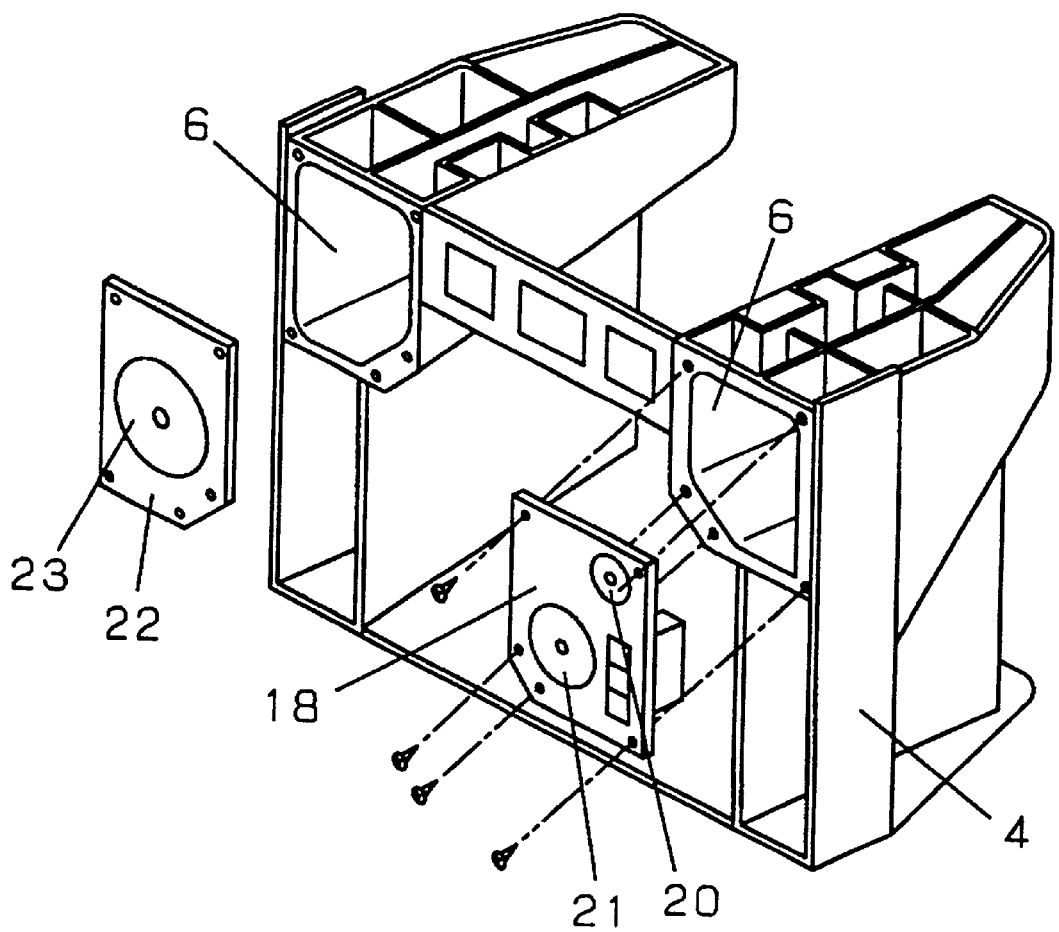
FIG. 9 is a perspective essential exploded view of the process of mounting speaker baffle boards 18, 22 on the speaker box 6.

The speaker system for composing the chassis 102 is described in detail. FIG. 8 is a perspective essential exploded view in the process of mounting a metal plate case 12A for optical unit and a speaker baffle board 18 on the speaker box 6 shown in FIG. 1. FIG. 9 is a perspective essential exploded view of the process of mounting speaker baffle boards 18, 22 on the speaker box 6.

In FIG. 8 and FIG. 9, the speaker box 6 is injection molded from resin integrally with the lower cabinet 4 as described above. The thickness of plate members for composing the speaker box 6 is about 2 mm to 3 mm, and the weight is reduced. However, if the plate thickness is thin, the rigidity of the speaker box 6 is lowered, and the vibration of speakers 20, 21, 23 may be transmitted to the CRT 15 of the optical unit 12, and the image of the television receiver may drift.

To improve this point, grating ribs are formed at a plurality of positions on the top of the speaker box 6. As a result, the rigidity of the speaker box 6 is improved. An example of grating rib is shown in FIG. 8. In FIG. 8, a boss 6A is disposed on the top of the speaker box 6, a cross rib and a rectangular rib surrounding the cross rib, and a linear rib are disposed around the boss 6A. The metal plate case 12A for optical unit is fitted to the boss 6A, and tightened with screw or the like. In this construction, vibration of the speakers 20, 21, 22 is hardly transmitted to the CRT 15.

At the front side of the right and left speaker boxes 6, speaker baffle boards 18, 22 are provided. For example, the speaker 20 (tweeter) and speaker 21 (woofer) is fitted to the speaker baffle board 18 (right), and a bass reflex port 18A is disposed as specified. For example, the speaker 23 (full range type) is fitted to the speaker baffle board 22 (left). The type and number of speakers installed in the speaker baffle board (right) 18 and speaker baffle board (left) 22 may be set arbitrarily. By changing the shape of the baffle boards, it is easy to cope with upgrading of the version of the speaker system.

A self-supporting mounting method of upper back cover 2 on the lower cabinet 4 is explained below.

Figure 10:
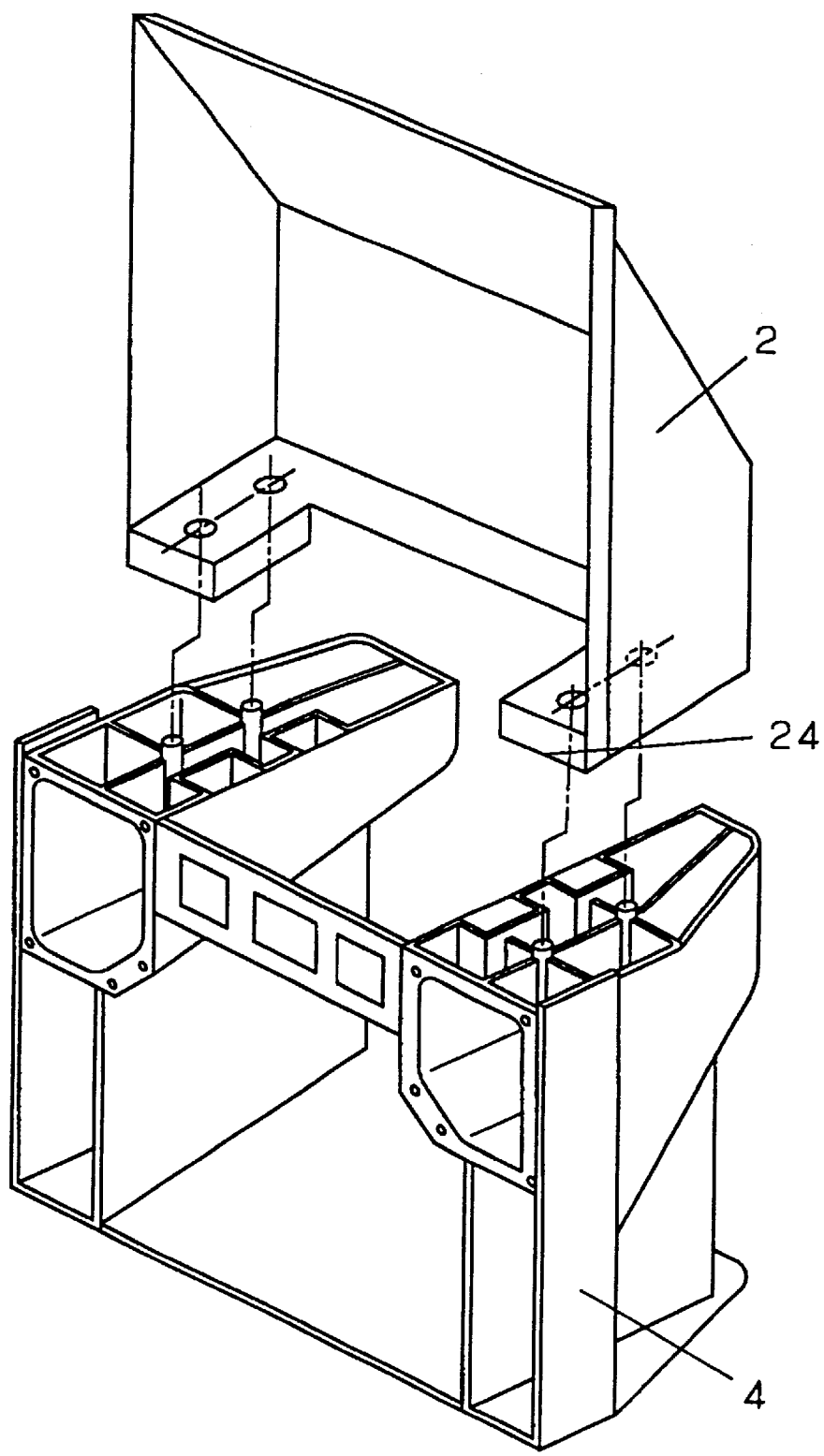
FIG. 10 is a perspective essential exploded view of the process of mounting an upper back cover 2 on a lower cabinet 4.
Figure 11:
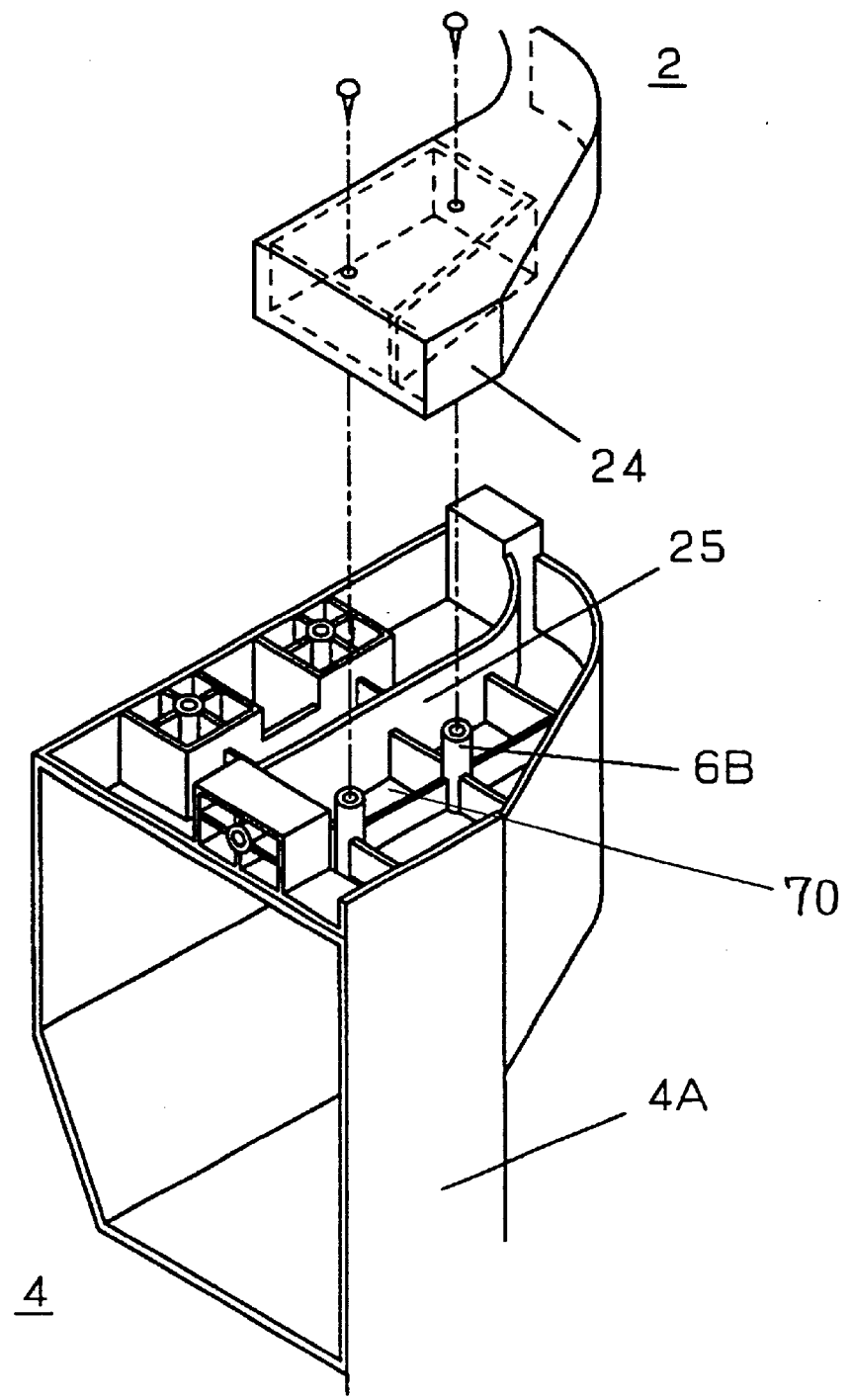
FIG. 11 is an exploded essential magnified view of FIG. 10.

FIG. 10 is a perspective essential exploded view of the process of mounting the upper back cover 2 on the lower cabinet 4, and FIG. 11 is an exploded essential magnified view of FIG. 10. In FIG. 10 and FIG. 11, when mounting and fixing the upper back cover 2 on the top side of the lower cabinet 4, the upper back cover is fitted to the guide portion of the lower cabinet 4, and the upper back cover is allowed to stand alone. Thus, the upper back cover 2 is fitted in a stable state. That is, the guide rib 25 and side wall 4A are disposed on the top of the speaker box of the lower cabinet 4, and a space 70 is formed in a region enclosed by a guide rib 25 and a side wall 4A. A skirt (fitting part) 24 of the upper back cover 2 is inserted into the space 70 so as to stand alone. Later, the skirt 24 is tightened with screws to the four bosses 6B disposed on the top of the speaker box.

Then, the upper cabinet 151 is fitted to the upper back cover 152. In this case, the transmission type screen 3 is fitted to the upper cabinet 151, and the upper cabinet 151 having the transmission type screen 3 is fitted to the upper back cover 152.

Exemplary Embodiment 2

Figure 12:
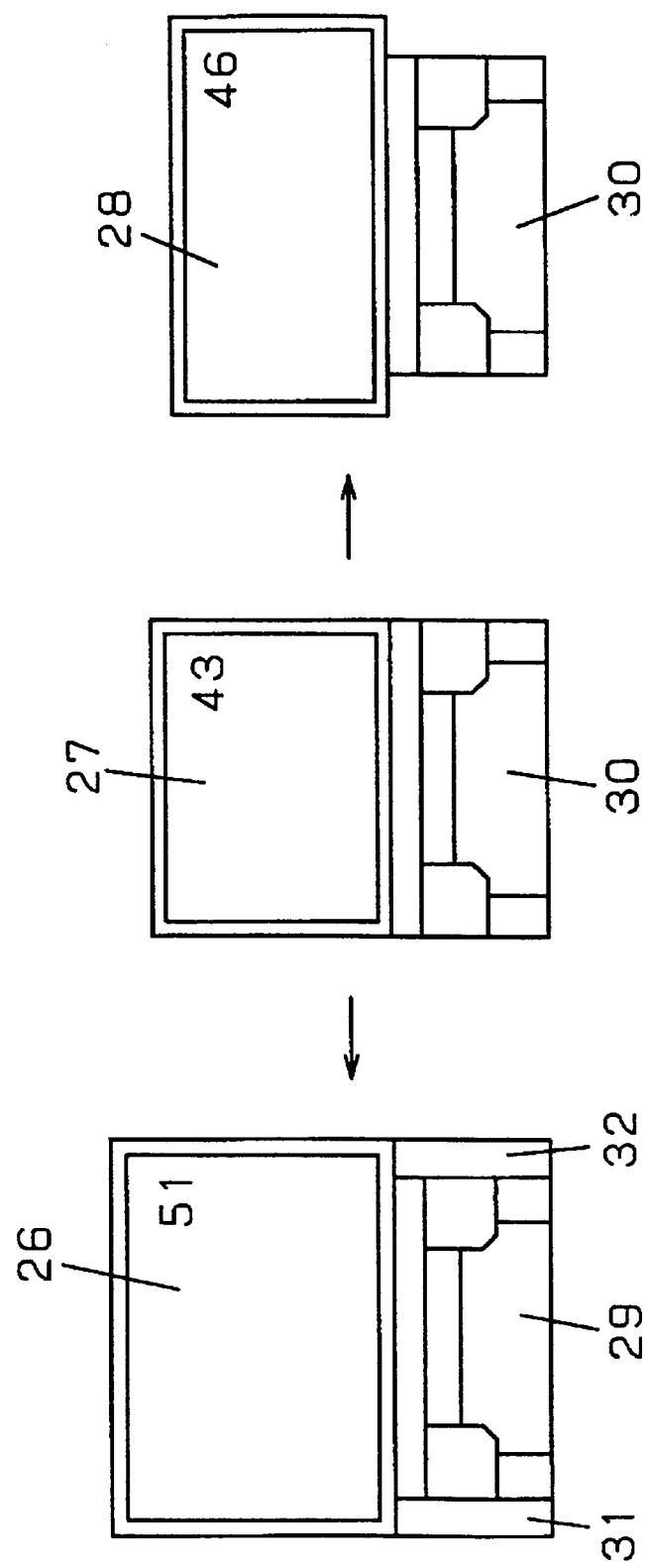
FIG. 12 is a front view of a projection type television receiver in embodiment 2 of the invention, showing the projection type television receiver corresponding to three types of upper cabinet, using one type of lower cabinet as a common member.
Figure 13:
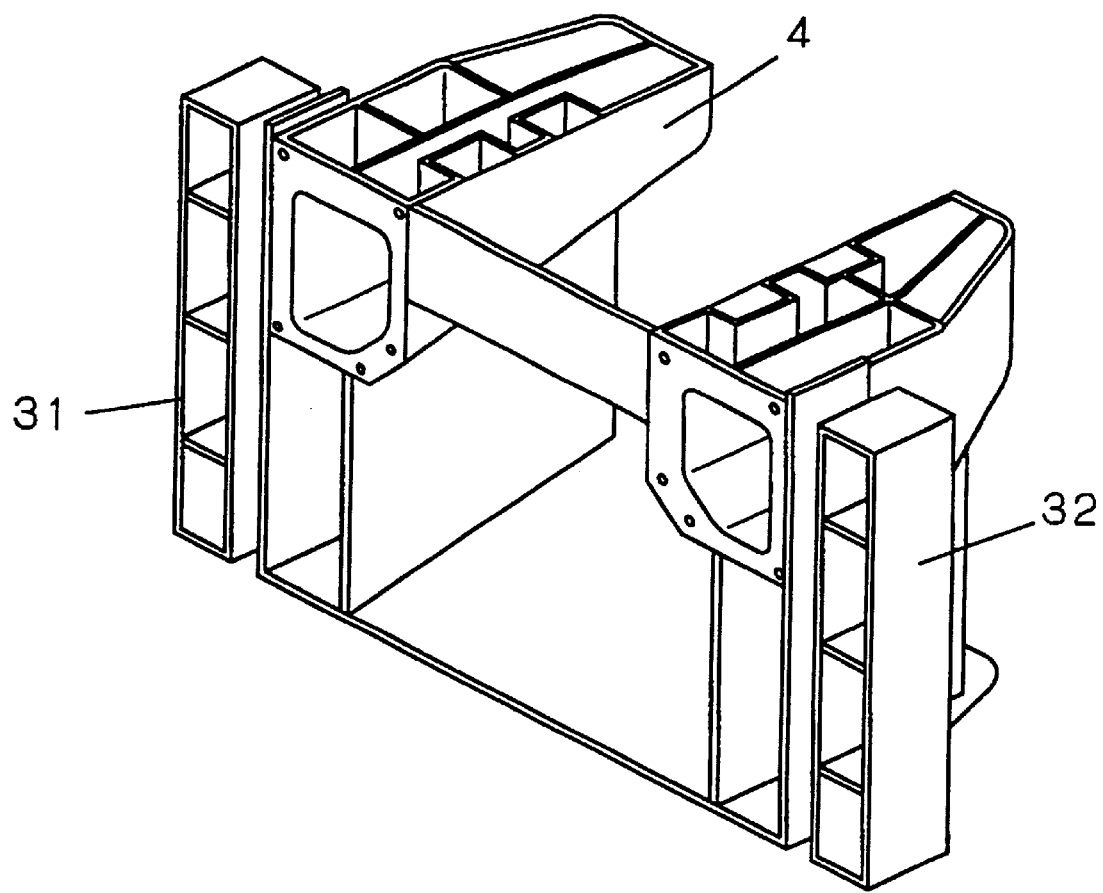
FIG. 13 is a perspective essential view of a state of a supplementary side wall on the lower cabinet in embodiment 2 of the invention.

A projection type television receiver capable of coping with changes of width dimension of the upper cabinet is explained. FIG. 12 is a front view of a projection type television receiver, showing the projection type television receiver corresponding to three types of upper cabinet, using one type of lower cabinet as a common member. FIG. 13 is a perspective essential view of a state of a supplementary side wall on the lower cabinet.

In FIG. 12, projection type television receivers of three sizes are shown, that is, 43 inches, 46 inches, and 51 inches. Each chassis includes a lower cabinet, a lower back cover, a speaker system, a CRT, an optical unit, and a control circuit. The projection unit includes an upper cabinet, an upper back cover, a transmission type screen, and a reflection mirror. The chassis and projection unit are coupled with screws. At both sides of the lower cabinet, supplementary side walls are fitted. As a result, the projection type television receiver flexible to cope with changes of width dimension of the upper cabinet is obtained.

In FIG. 13, as supplementary side walls, a left insert 31 and a right insert 32 of a slender shoe box shape (a box shape having a plurality of racks) are disposed. The left insert 31 and right insert 32 are detachably fitted to the lower cabinet 4 with screws or the like.

In FIG. 12 and FIG. 13, a lower cabinet 30 used in the receiver having an upper cabinet 27 of 43-inch class is the lower cabinet as a common member. At both sides of this lower cabinet 30, the left insert 31 and right insert 32 are disposed as supplementary side walls, and the lower cabinet used in the receiver having the upper cabinet 26 of 51-inch class is fabricated. Similarly, using the lower cabinet 30 used in the receiver of 43-inch class, the wide-screen television receiver having the upper cabinet 28 of 16:9 size wide screen of 46-inch class can be also manufactured. As the resin mold for injection molding of the chassis, by using the telescopic mold, the supplementary side walls can be formed integrally.

Exemplary Embodiment 3

Figure 14:
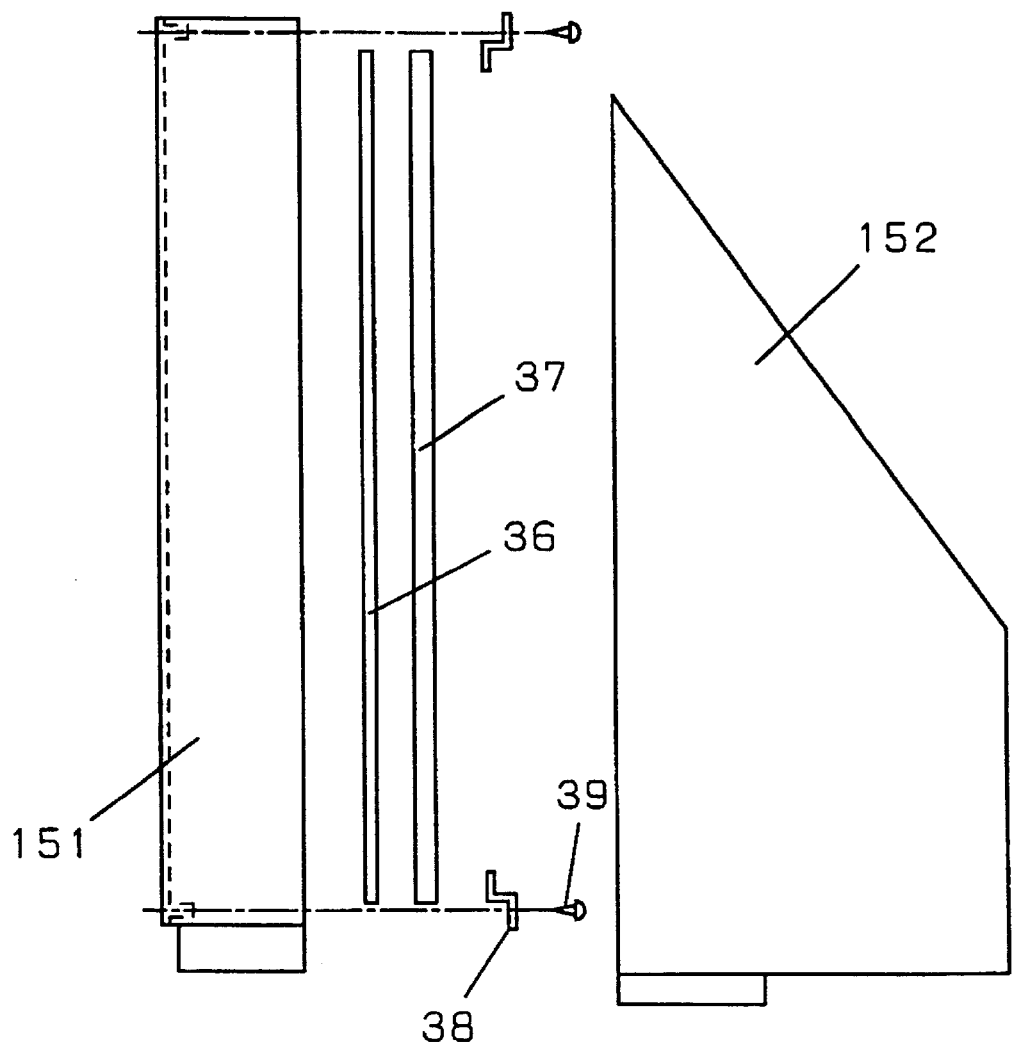
FIG. 14 is an essential exploded side view of upper cabinet and upper back cover of a projection type television receiver in embodiment 3 of the invention.
Figure 15:
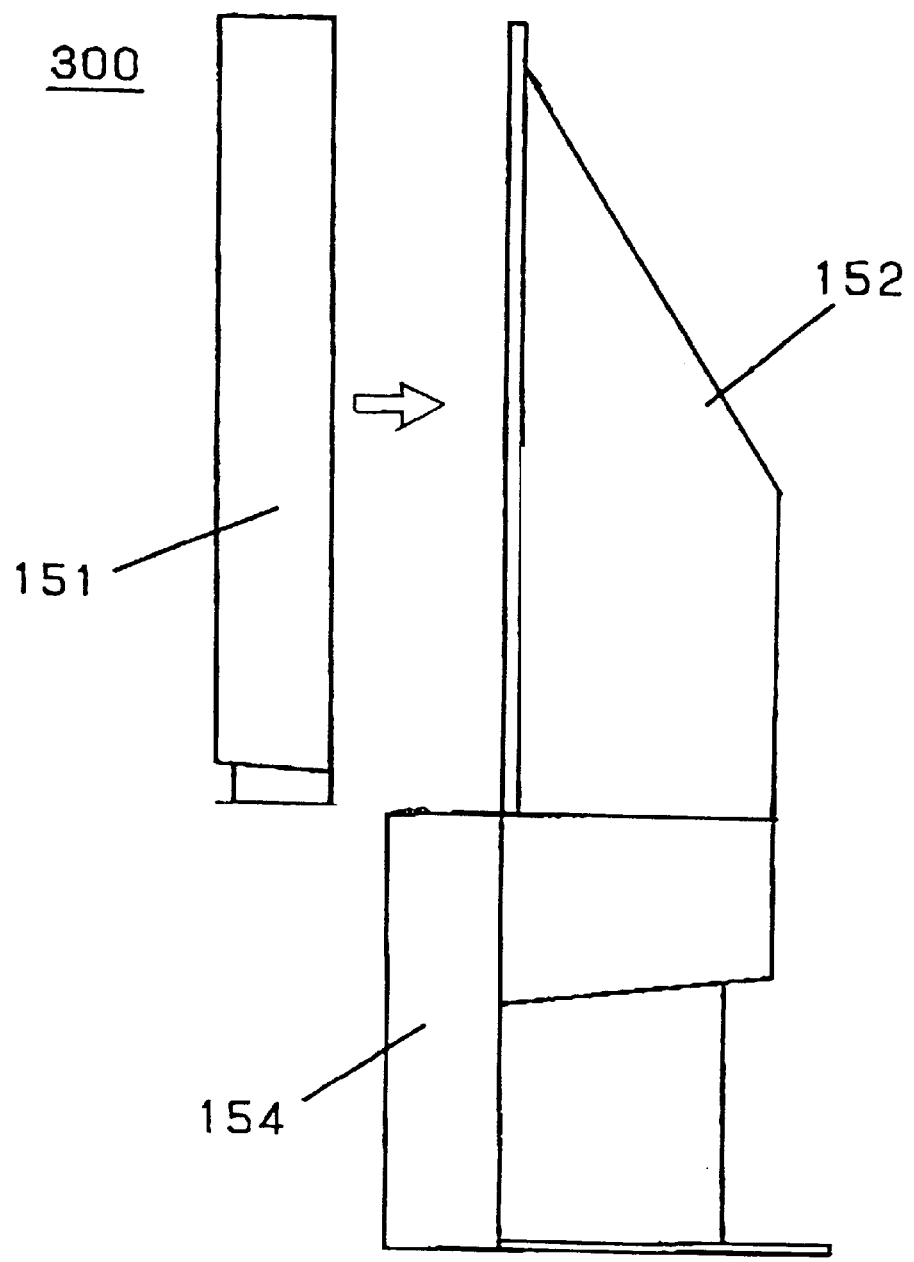
FIG. 15 is a side view of a process of mounting an upper back cover in the projection type television receiver in embodiment 3 of the invention.

A projection type television receiver in exemplary embodiment 3 of the invention is explained. FIG. 14 and FIG. 15 show a projection type television receiver 300 in exemplary embodiment 3. FIG. 14 is an essential exploded side view of upper cabinet and upper back cover, and FIG. 15 is a side view of a process of mounting the upper back cover. In the projection type television receiver 300 of the embodiment, the upper cabinet 151 functions also as the screen frame. The depth dimension of the upper cabinet 151 is small.

The upper cabinet 151 is formed like a box. The rear side of the upper cabinet 151 is open. The viewer side of the upper cabinet 151 has an opening corresponding to the screen size. Toward the viewer side opening, a lenticular lens sheet 36 and a Fresnel lens sheet 37 are sequentially laminated. Then, using a screen holder 38, the lenticular lens sheet 36 and Fresnel lens sheet 37 tightened with screws to the upper cabinet 151. The upper cabinet 151 functions also as the screen frame. The depth dimension of the upper cabinet 151 is about 100 mm or less.

A film mirror (not shown) for reflecting the projection light from the optical unit 12 is disposed at the inner side of an upper back cover 152. As shown in FIG. 15, the upper back cover 152 is tightened to the top of a lower cabinet 154 with screws.

Then, the upper cabinet 151 comprising the lenticular lens sheet 36 and Fresnel lens sheet 37 is fitted to the upper back cover 152.

Not limited to this constitution, it is also possible to compose so that the upper cabinet 151 may stand alone temporarily on the lower cabinet 154. As the standing method, the same structure as the upper back cover, or the structure of planting two shafts on the top of the lower cabinet 154 and combining the shafts with the holes in the upper cabinet may be also possible.

In this configuration, the depth dimension of the upper cabinet can be reduced. The weight is also lowered. Since the upper cabinet 151 is used also as the screen frame, installation of screen frame can be omitted.

Exemplary Embodiment 4

Figure 16:
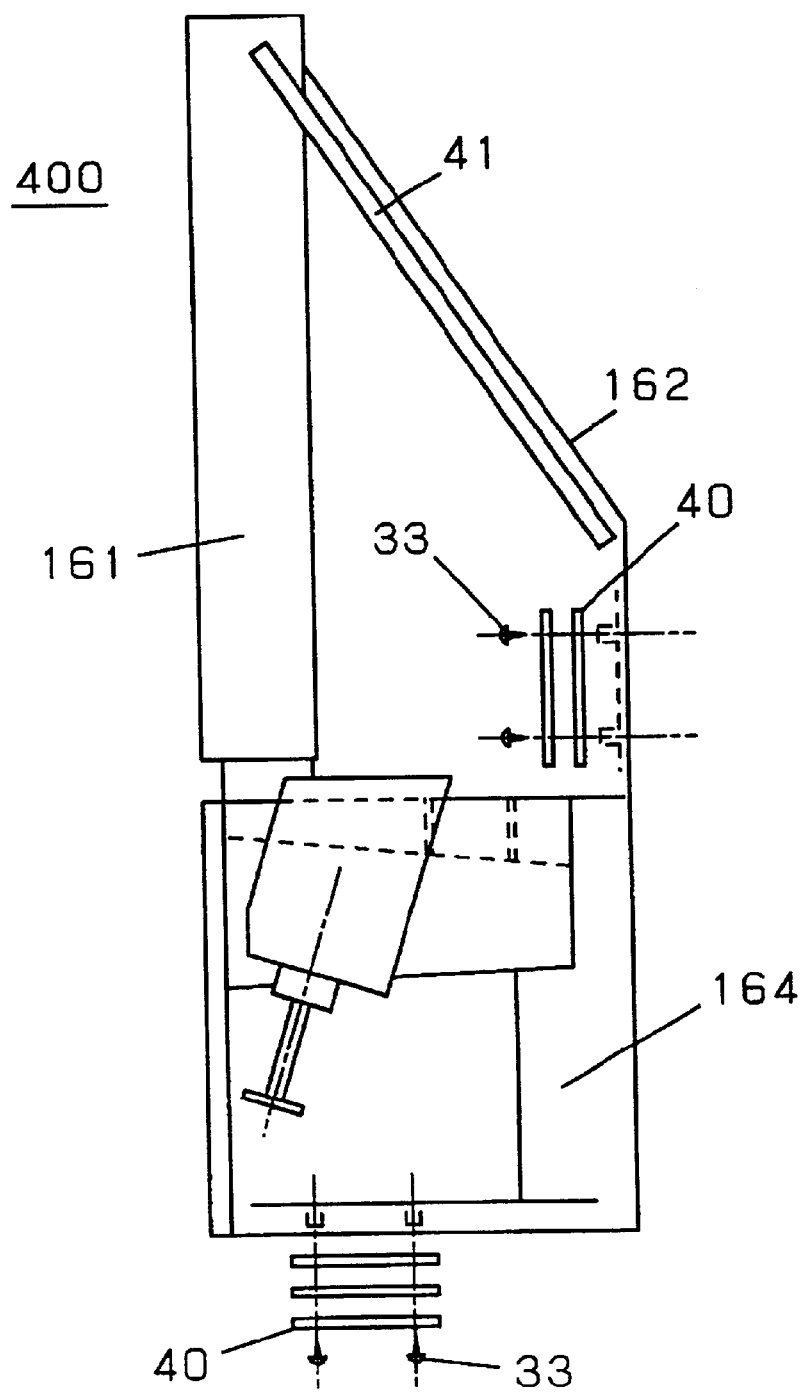
FIG. 16 is an essential sectional view seen from a side direction, showing a projection type television receiver in embodiment 4 of the invention.

A projection type television receiver 400 in exemplary embodiment 4 of the invention is explained. FIG. 16 is an essential sectional view seen from a side direction of the projection type television receiver in embodiment 4, and FIG. 17 shows an perspective essential view before assembly and a side view after assembly of the projection type television receiver in other example of embodiment 4.

The projection type, television receiver 400 comprises a chassis and a projection unit. The chassis includes lower cabinets 164, 174, a lower back cover 164 fitted to the lower cabinet, speaker systems 42, 43, 46, 176, an optical unit, and a control circuit. The projection unit includes an upper back cover 162, an upper cabinet 161 fitted to the upper back cover 162, a transmission type screen, and a reflection mirror 41. The chassis and projection unit are coupled together. The reflection mirror (film mirror) 41 is disposed at the back side of the upper back cover 162. As shown in FIG. 16, a plumb 40 is disposed in at least one of the bottom of the lower cabinet 164 and the rear side of the upper back cover 162. The plumb 40 has a function of preventing tumbling of the projection type television receiver 400. Or, as shown in FIG. 17 (B), an anti-tumble leg 44 is disposed at the front lower part of the lower cabinet 174. Thus, at least one of the plumb 40 and anti-tumble leg 44 is disposed.

In FIG. 16, the plumb 40 is disposed at the bottom side of the lower cabinet 164 and the rear inner side of the upper back cover 162. That is, the plumb 40 is disposed at the bottom side of the lower cabinet 164 by means of a tightening screw 33. The plumb 40 is further disposed at the rear inner side of the upper back cover 162 by means of a tightening screw 33. The plumb 40 has an arbitrary weight depending on the model type.

Figure 17:
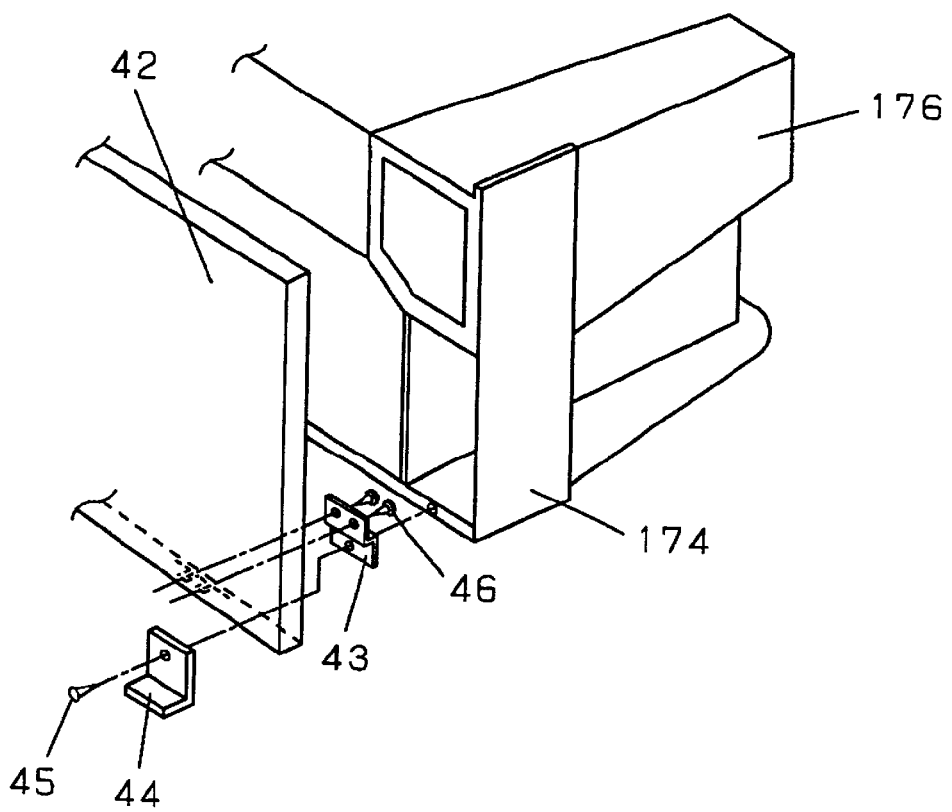
FIG. 17 (A) is an perspective essential view before assembly of projection type television receiver in other example of embodiment 4, and FIG. 17 (B) is a side view after assembling in FIG. 17 (A).
Figure 17:
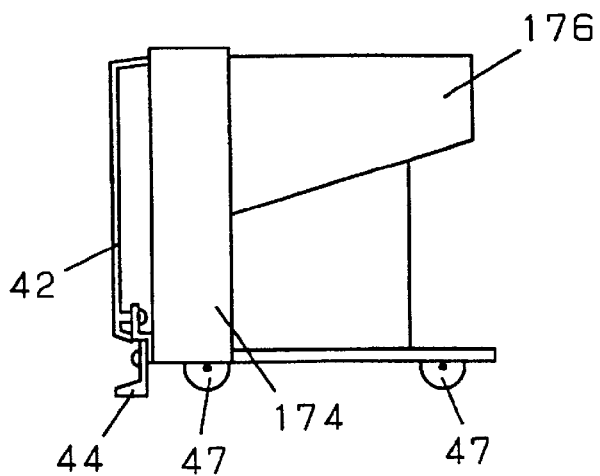
Figure 18:
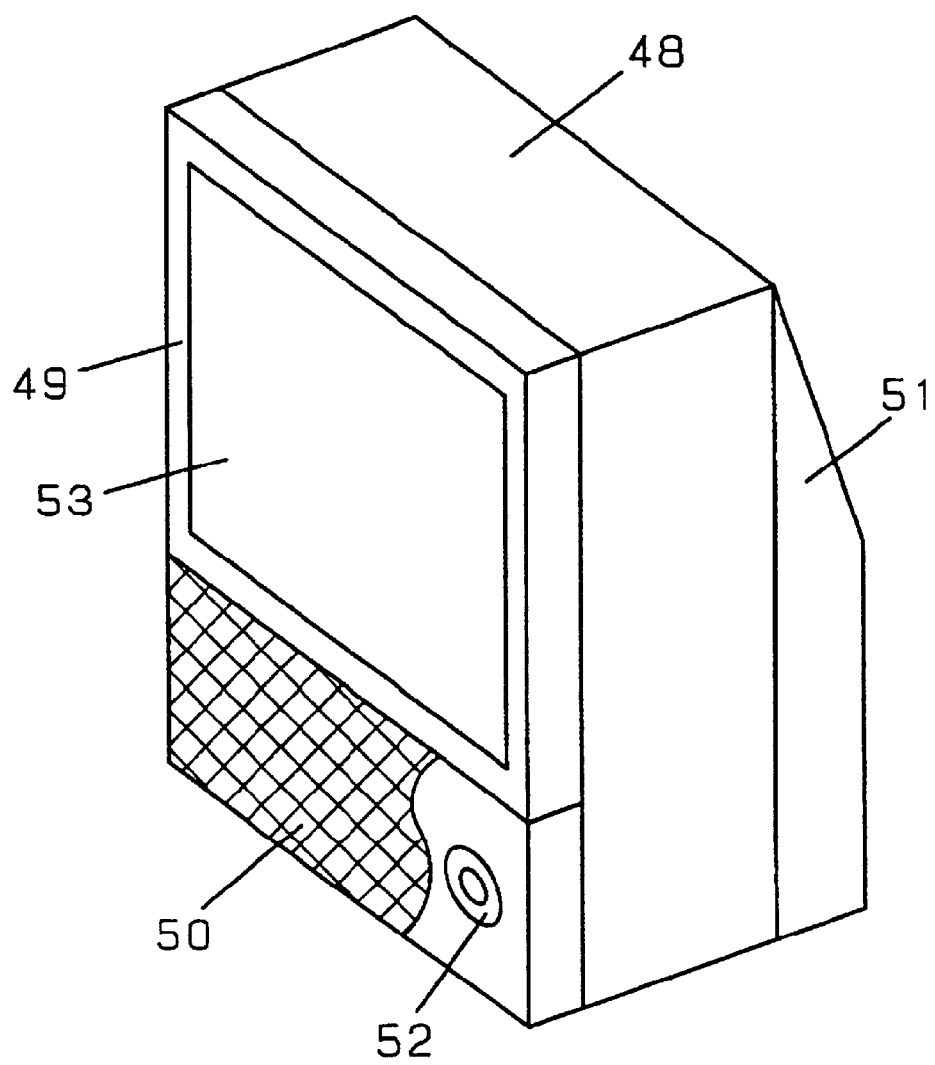
FIG. 18 is a perspective outline view of a conventional projection type television receiver.

If the tumble preventing force is not enough with the plumbs disposed at two positions, as shown in FIG. 17 (B), an L-shaped anti-tumble leg 44 is disposed at the front side (viewer side) of the lower cabinet 174 in contact with the ground. In FIG. 17, the television receiver comprises a speaker grill 42, a speaker grill fixing bracket 43, tightening screws 45, speaker grill tightening screws 46, and casters 47.

In this configuration, the depth dimension of the projection type television receiver can be reduced in a range of about 40 cm to about 45 cm. Thus, the projection type television receiver adjusted to the depth dimension of the general furniture is obtained.

Thus, according to the invention, by dividing into upper and lower blocks of chassis and projection unit, the assembling work is easy. Further, the chassis can be used commonly in manufacture of receivers differing in size.

By forming the cabinet of each block by injection molding from resin, the weight is reduced, the number of parts is curtailed, and hence the cost is reduced.

By disposing at least one of the plumb and L-shaped leg, the depth dimension of the television receiver is reduced. Further, tumbling of the television receiver reduced in thickness can be prevented.

As the chassis has a plurality of spaces divided by partition walls, the rigidity of the cabinet is improved. Each control circuit board disposed in a plurality of spaces is prevented from having thermal effects mutually.

Since the chassis and projection unit are separated, transfer of heat or dust between the chassis and projection unit is prevented. As the partition board is inclined, or the partition board is made of metal member, release of heat generated inside the television receiver is promoted.

What is claimed is:

1. A projection type television receiver comprising:
   (a) a chassis,
   said chassis including a lower cabinet, a lower back cover fitted to said lower cabinet, an image display device, a speaker system, a speaker box, an inclined partition unit, an optical unit extending above said inclined partition unit, and a control circuit, and
   (b) a projection unit installed at the upper side of said chassis,
   said projection unit including an upper back cover, an upper cabinet, a transmission type screen, and a reflection mirror,
   wherein said chassis and projection unit are mutually linked.

2. The projection type television receiver of claim 1, wherein said upper cabinet has a nearly box shape,
   said upper cabinet functions also as a screen frame, and
   said transmission type screen is fitted to the upper cabinet of nearly box shape.

3. The projection type television receiver of claim 1, wherein said upper cabinet is fitted to said upper back cover.

4. The projection type television receiver of claim 2, wherein said transmission screen has laminated lenticular lens sheet and Fresnel lens sheet.

5. The projection type television receiver of claim 1, wherein at least one selected from the group consisting of the lower cabinet, lower back cover, upper cabinet, and upper back cover is made of a resin material.

6. A projection type television receiver comprising:
   (a) a chassis,
   said chassis including a lower cabinet, a speaker box, an inclined partition unit, and an optical unit extending above said inclined partition unit,
   (b) a projection unit installed at the upper side of said chassis,
   said projection unit including an upper cabinet, and a transmission type screen installed on said upper cabinet,
   wherein said lower cabinet and speaker box are mutually formed integrally, thereby enhancing the rigidity of the lower cabinet.

7. The projection type television receiver of claim 6,
   wherein said chassis includes a lower back cover fitted to the lower cabinet, an image display device, a speaker system disposed in the speaker box, and a control circuit, and
   said projection unit includes an upper cabinet fitted to the upper back cover, and a reflection mirror.

8. The projection type television receiver of claim 6,
   wherein said speaker box has a plurality of speaker boxes, and
   said plurality of speaker boxes include a left speaker box formed integrally with the lower cabinet at the upper left corner of the lower cabinet, and a right speaker box formed integrally with the lower cabinet at the upper right corner of the lower cabinet.

9. The projection type television receiver of claim 6,
   wherein said lower cabinet has a partition wall disposed in the lower cabinet, and
   the lower cabinet has a plurality of spaces divided by said partition wall.

10. The projection type television receiver of claim 9,
    wherein said chassis has a plurality of control circuit boards, and
    each control circuit board of said plurality of control circuit boards is disposed at least in two spaces of said plurality of spaces,
    thereby preventing mutual thermal effects of each control circuit board.

11. The projection type television receiver of claim 9,
    wherein said plurality of spaces include a central chamber formed in the center of the lower cabinet, a left chamber formed in the left part of the lower cabinet, and a right chamber formed in the right part of the lower cabinet, and
    said speaker boxes include a left speaker box disposed at the upper side of the left chamber and a right speaker box disposed at the upper side of the right chamber.

12. The projection type television receiver of claim 6, wherein said partition unit is disposed between the chassis and projection unit in order to divide the chassis and projection unit,
    wherein said partition unit has a function of preventing invasion of at least one of dust and heat, mutually in the chassis and projection unit.

13. The projection type television receiver of claim 12,
    wherein said partition unit forms a flow of air along the slope of the partition unit.

14. The projection type television receiver of claim 12, wherein said partition unit is a metal member.

15. A projection type television receiver comprising:
    (a) a chassis,
    said chassis including a lower cabinet, a lower cover fitted to said lower cabinet, an image display device, a speaker box, a speaker system, an inclined partition unit, an optical unit extending above said inclined partition unit, and a control circuit, and
    (b) a projection unit installed at the upper side of said chassis,
    said projection unit including an upper back cover, an upper cabinet, a transmission type screen, and a reflection mirror, wherein said speaker box is formed integrally with said lower cabinet, at both corners of the top side of the lower cabinet, and said speaker box has a plurality of ribs disposed on the top of the speaker box, thereby preventing the vibration generated in the speaker box from transmitting to the projection unit.

16. The projection type television receiver of claim 15, wherein said plurality of ribs are grating ribs.

17. The projection type television receiver of claim 15, wherein said speaker system has a baffle board disposed detachably at the front side of the speaker box.

18. A projection type television receiver comprising:

(a) a chassis, said chassis including a lower cabinet, a lower cover fitted to said lower cabinet, an image display device, a speaker system, an inclined partition unit, an optical unit extending above said inclined partition unit, and a control circuit, and (b) a projection unit installed at the upper side of said chassis, said projection unit including an upper cabinet, an upper back cover fitted to said upper cabinet, a transmission type screen, and a reflection mirror, wherein said lower cabinet includes a speaker box having a guide rib and a side wall enclosing a space on a top of the speaker box, said upper back cover has a guide disposed at the lower side of the upper back cover, said guide being fitted into the space.

19. A projection type television receiver comprising:

(a) a chassis, said chassis including a lower cabinet, a lower cover fitted to said lower cabinet, an image display device, a speaker system, an inclined partition unit, an optical unit extending above said inclined partition unit, and a control circuit, and (b) a projection unit installed at the upper side of said chassis, said projection unit including an upper cabinet, an upper back cover fitted to said upper cabinet, a transmission type screen, and a reflection mirror, wherein said lower cabinet further includes a left supplementary side wall disposed detachably connected to the left part of the lower cabinet, and a right supplementary side wall disposed detachably connected to the right part of the lower cabinet, thereby the dimension of the lower cabinet is variable, corresponding to a change of a width dimension of the upper cabinet.

20. A projection type television receiver comprising:

(a) a chassis, said chassis including a lower cabinet, a lower cover fitted to said lower cabinet, an image display device, a speaker system, an inclined partition unit, an optical unit extending above said inclined partition unit, and a control circuit, (b) a projection unit installed at the upper side of said chassis, said projection unit including an upper back cover, an upper cabinet, a transmission type screen, and a reflection mirror, and (c) a first plumb disposed at and fastened to a bottom of the lower cabinet and a second plumb disposed in the rear part of the upper back cover, wherein said chassis and projection unit are mutually linked, thereby preventing tumbling.

21. The projection type television receiver of claim 20, further comprising an anti-tumble leg disposed in the front lower part of the lower cabinet.

22. A manufacturing method of projection type television receiver comprising the steps of:

(a) making a lower cabinet, (b) forming a speaker box integrally in the lower cabinet, (c) making a lower back cover, (d) making an upper cabinet, (e) making an upper back cover, (f) fitting the lower back cover to the lower cabinet, and (g) coupling the upper back cover and upper cabinet on the speaker box in the lower cabinet by coupling means.

23. The manufacturing method of projection type television receiver of claim 22, further comprising the steps of:

(g) placing a speaker system, an inclined partition, an optical unit extending above said inclined partition, and a control circuit in the lower cabinet, (h) installing a transmission screen in the upper cabinet, and (i) installing a reflection mirror in the upper back cover.

24. The manufacturing method of projection type television receiver of claim 22, wherein step (b) includes forming the speaker box at an upper corner of the lower cabinet.

25. The manufacturing method of projection type television receiver of claim 22, wherein said step of making the lower cabinet includes a step of forming the lower cabinet by a resin material, said step of making the upper cabinet includes a step of forming the upper cabinet by a resin material, said step of making the lower back cover includes a step of forming the lower back cover by a resin material, and said step of making the upper back cover includes a step of forming the upper back cover by a resin material.

26. The manufacturing method of projection type television receiver of claim 23, wherein said lower cabinet has a plurality of small chambers divided by partition walls, and said step (g) includes a step of placing a first control circuit board in a first small chamber of the plurality of small chambers, and a step of placing a second control circuit board in a second small chamber of the plurality of small chambers.

27. The manufacturing method of projection type television receiver of claim 22, wherein at least one of the lower cabinet and lower back cover has a partition board, and said partition board has a function of dividing into the upper side and lower side of the partition board.

28. The manufacturing method of projection type television receiver of claim 27, wherein said partition board has a shape inclined to the horizontal direction, and the partition board has a function of forming a flow of air along the inclined shape to release the heat to outside.

29. The manufacturing method of projection type television receiver of claim 27, wherein said partition board is made of a material having a thermal conductivity equivalent or superior to that of metal.

30. The manufacturing method of projection type television receiver of claim 22, wherein said step of making the lower cabinet includes a step of forming a speaker box integrally with the lower cabinet at the upper corner of the lower cabinet, said speaker box has ribs placed on the top of the speaker box, and these ribs have a function of preventing propagation of vibration generated from the speaker box.

31. The manufacturing method of projection type television receiver of claim 22, further comprising the step of;

(h) placing at least one selected from the group consisting of:
i) a first plumb placed in the bottom of the lower cabinet,
ii) a first plumb placed in the rear part of the upper back cover, and
iii) an anti-tumble leg placed in the front lower part of the lower cabinet.

32. The manufacturing method of projection type television receiver of claim 22, wherein said step (f) of putting the upper back cover on the lower cabinet includes a step of mounting the upper back cover on the lower cabinet, in a self-supporting state of the upper back cover, while fitting a second guide formed in the upper back cover to the first guide formed in the lower cabinet.

33. The manufacturing method of projection type television receiver of claim 22, wherein said upper cabinet has also a function of screen frame, the method further comprising the step of:

(k) laminating and mounting a lenticular lens sheet and a Fresnel lens sheet on the upper cabinet.

34. The manufacturing method of projection type television receiver of claim 22, further comprising the step of:

(i) a step of coupling a supplementary side wall detachably at least at one side of right side and left side of the lower cabinet.

35. The manufacturing method of projection type television receiver of claim 22, wherein said step of coupling the upper back cover and upper cabinet on the lower cabinet includes a step of forming the upper back cover on the lower cabinet, and a step of forming the upper cabinet on the upper back cover fitted to the lower cabinet.

36. The manufacturing method of projection type television receiver of claim 22, further comprising:

a step of mounting a transmission type screen on the upper cabinet, wherein said step of coupling the upper back cover and upper cabinet on the lower cabinet includes a step of forming the upper back cover on the lower cabinet, and a step of forming the upper cabinet having the transmission type screen on the upper back cover fitted to the lower cabinet.

37. A projection type television receiver according to claim 1, wherein said lower cabinet and said speaker box are mutually formed integrally.

38. A projection type television receiver according to claim 1, said inclined partition unit for directing heat from an interior of said receiver to an exterior of said receiver.

39. A projection type television receiver according to claim 1, further comprising grating ribs formed on top of said speaker box for preventing transmission of vibration from said speaker box to said projection unit.

40. A projection type television receiver according to claim 18, said inclined partition unit for directing heat from an interior of said receiver to an exterior of said receiver.

41. A projection type television receiver according to claim 18, further comprising grating ribs formed on top of said speaker box for preventing transmission of vibration from said speaker box to said projection unit.

42. A projection type television receiver according to claim 19, said inclined partition unit for directing heat from an interior of said receiver to an exterior of said receiver.

43. A projection type television receiver according to claim 19, further comprising grating ribs formed on top of said speaker box for preventing transmission of vibration from said speaker box to said projection unit.

44. A projection type television receiver according to claim 20, said inclined partition unit for directing heat from an interior of said receiver to an exterior of said receiver.

45. A projection type television receiver according to claim 20, further comprising grating ribs formed on too of said speaker box for preventing transmission of vibration from said speaker box to said projection unit.

46. A projection type television receiver according to claim 6, said inclined partition unit for directing heat from an interior of said receiver to an exterior of said receiver.

47. A projection type television receiver according to claim 6, further comprising grating ribs formed on top of said speaker box for preventing transmission of vibration from said speaker box to said projection unit.

48. A projection type television receiver according to claim 15, said inclined partition unit for directing heat from an interior of said receiver to an exterior of said receiver.

49. A projection type television receiver according to claim 15, further comprising grating ribs formed on top of said speaker box for preventing transmission of vibration from said speaker box to said projection unit.

* * * * *

UNITED STATES PATENT AND TRADEMARK OFFICE
CERTIFICATE OF CORRECTION

PATENT NO.   : 6,661,473 B1
DATED        : December 9, 2003
INVENTOR(S)  : Akihiko Teshima et al.

It is certified that error appears in the above-identified patent and that said Letters Patent is hereby corrected as shown below:

Column 16,
Line 33, "too" should read -- top --

Signed and Sealed this

Sixth Day of July, 2004

JON W. DUDAS
*Acting Director of the United States Patent and Trademark Office*